(12) United States Patent
Reinart et al.

(10) Patent No.: US 8,554,909 B2
(45) Date of Patent: Oct. 8, 2013

(54) REDUCING MESSAGING IN A CLIENT-SERVER SYSTEM

(76) Inventors: John Andrew Reinart, Roseville, MN (US); Stephen Philip Lord, Prior Lake, MN (US); Eric Berge, Apple Valley, MN (US)

( * ) Notice: Subject to any disclaimer, the term of this patent is extended or adjusted under 35 U.S.C. 154(b) by 0 days.

(21) Appl. No.: 13/471,555

(22) Filed: May 15, 2012

(65) Prior Publication Data

US 2012/0226755 A1 Sep. 6, 2012

Related U.S. Application Data

(63) Continuation of application No. 12/639,390, filed on Dec. 16, 2009, now Pat. No. 8,190,736.

(51) Int. Cl.
*G06F 13/00* (2006.01)
(52) U.S. Cl.
USPC ............................ 709/224; 709/203; 709/226
(58) Field of Classification Search
USPC ......................... 709/201, 203, 223, 224, 226
See application file for complete search history.

(56) References Cited

U.S. PATENT DOCUMENTS

| 6,856,995 | B1 | 2/2005 | Ibitayo et al. | |
|---|---|---|---|---|
| 7,007,278 | B2 | 2/2006 | Gungabeesoon | |
| 7,613,193 | B2 * | 11/2009 | Swami et al. | 370/395.52 |
| 7,870,352 | B2 | 1/2011 | Stalker | |
| 7,930,410 | B2 * | 4/2011 | Degenkolb et al. | 709/228 |
| 2007/0022199 | A1 | 1/2007 | Tatsubori | |

* cited by examiner

*Primary Examiner* — Viet Vu (57) ABSTRACT

A detection that a client-server system, which is operating in a first state mode, has switched from a first use case to a second use case for accessing a property of an object associated with a server. The first state mode during the first use case reduces messaging in the client-server system as compared to using a second state mode. A determination is performed as to whether using the second state mode during the second use case would reduce messaging in the system as compared to using the first state mode. The client-server system is transitioned to the second state mode, if operating in the second state mode would reduce messaging in the client-server system as compared to operating in the first state mode for the second use case.

18 Claims, 4 Drawing Sheets

REDUCING MESSAGING IN A CLIENT-SERVER SYSTEM

CROSS REFERENCE TO RELATED APPLICATIONS

This application is a continuation of U.S. application Ser. No. 12/639,390, filed Dec. 16, 2009, issued May 29, 2012 as U.S. Pat. No. 8,190,736 B2 entitled "Reducing Messaging in a Client-Server System."

BACKGROUND

With the advent of computers and computer networks, people are storing information, in the form of objects, in memory that is accessible by server computers associated with client-server systems. A client-server system allows a person to use a client computer to access a part of an object (also referred to herein as a "property" or an "object property") to read or write to the object. For example, a person can use a client computer to request a copy of the object property that is stored on the server. In response to the request, the server provides the requested copy to the client computer. A reader associated with a client computer is used for accessing the object property in read mode. A writer associated with a client computer is used for accessing the object property in write mode.

A plurality of readers, a plurality of writers, or a combination thereof, can request to access the object property. In order to coordinate a plurality of requests for accessing the object property, two different state modes, stateless mode and stateful mode, have conventionally been used. Stateful mode provides a higher level of coherency for the object property than stateless mode. In other words, there is a significantly lower probability with stateful mode than with stateless mode that either a reader or a writer will have a down level copy of a requested object property or that one writer's modification to an object property will inadvertently delete another writer's modification to the same object property, for example, due to the timing of when the respective modifications are received by the server. However, stateful mode is known to result in more messaging between the clients and the server in order to provide the higher level of coherency. Therefore, people have had to choose between reducing messaging as provided by stateless mode and a higher level of coherency provided by stateful mode.

BRIEF DESCRIPTION OF THE DRAWINGS

The accompanying drawings, which are incorporated in and form a part of this specification, illustrate embodiments of the subject matter and, together with the description, serve to explain principles discussed below.

The drawings referred to in this brief description should be understood as not being drawn to scale unless specifically noted.

DESCRIPTION OF EMBODIMENTS

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the following description of embodiments, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the description of embodiments, discussions utilizing terms such as "detecting," "determining," "operating," "using," "accessing," "messaging," "transitioning," "comparing," "associating," "requesting," "deleting," "registering," "de-registering," "receiving," "transmitting," "communicating," "creating," "obtaining," "executing," "storing," "detecting," "switching," "causing," "transforming data," "modifying data to transform the state of a computer system," or the like, refer to the actions and processes of a computer system, data storage system, storage system controller, microcontroller, processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

Introduction of the Discussion

In many client-server systems, the stateless mode does not always minimize messaging in comparison to stateful mode for a client-server system that enables readers and writers to access an object. For example, although it has been conventionally believed that stateless mode results in fewer messages than stateful mode, the number of readers and the number of writers accessing an object property through a server affects whether stateful mode or stateless mode will result in less messaging in the client-server system. In some instances, two sets of use cases, which are defined in terms of the number of readers and the number of writers accessing a property of an object, respectively provide reduced messaging for stateful mode and stateless mode. Therefore, according to one embodiment, a client-server system is provided that operates, relative to a given object, in stateful mode for one set of use cases and operates in stateless mode for a second set of uses cases. The client-server system, provided by various embodiments, transitions between stateful mode and stateless mode for a given object depending on the use case, as defined by the number of readers and the number of writers that are accessing the property.

Figure 1:
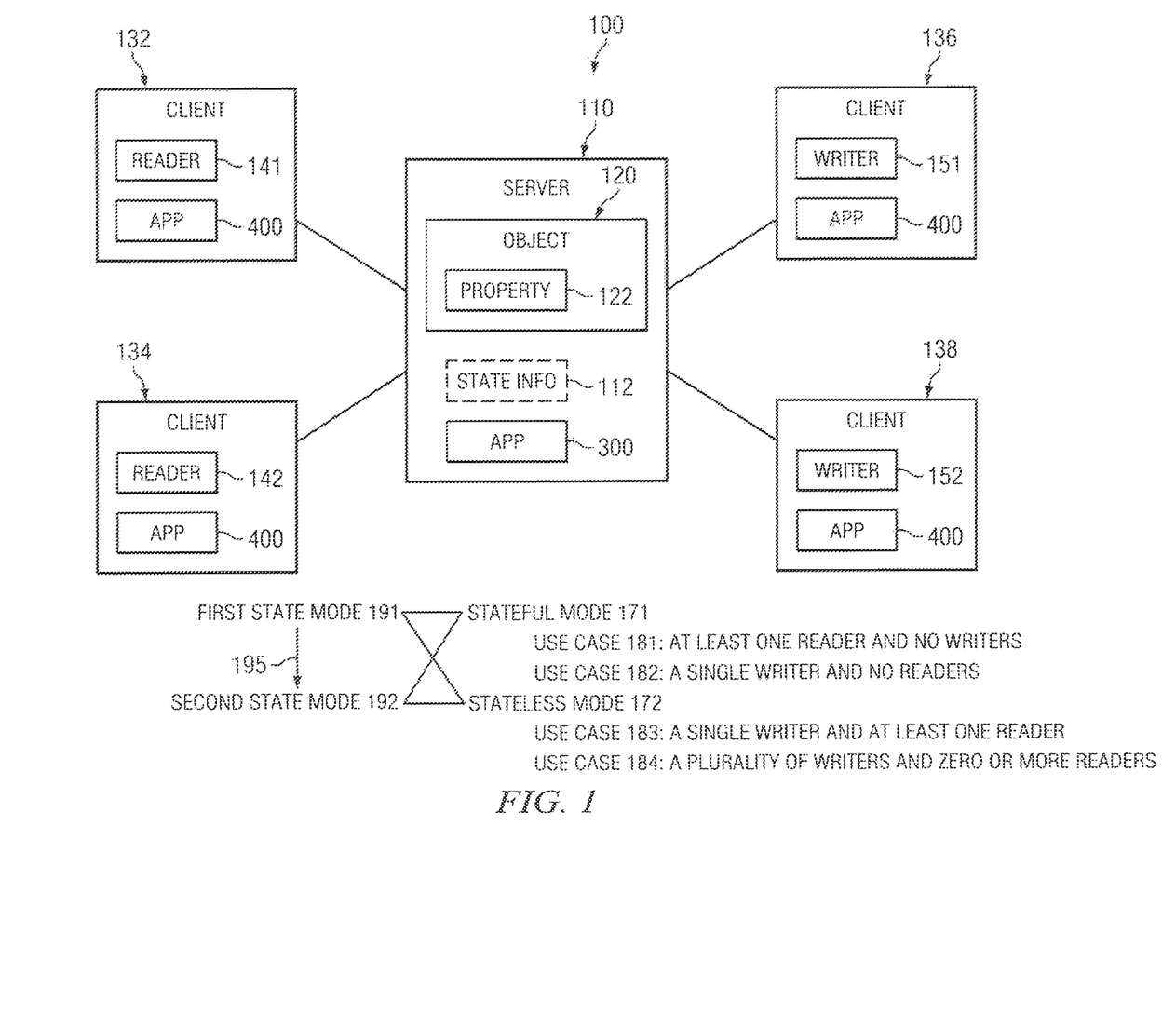
FIG. 1 depicts a block diagram of a client-server system that reduces coherency messaging, according to one embodiment.

FIG. 1 depicts a block diagram of a client-server system 100 that reduces messaging, according to one embodiment. The client-server system 100 includes a server 110 and clients 132-138. According to one embodiment, the server 110 and the clients 132-138 are electronic devices. For the sake of simplicity, the server 110 is depicted with one object 120 and one property 122. However, servers 100 are well suited for storing a multitude of objects 120 and associated properties 122. The server 110 includes a server apparatus 300. The server apparatus 300 shall be described in more detail in the context of FIG. 3 below. The server 110 may also include optional state information 112. Each of the clients 132-138 includes a client apparatus 400. The client apparatus 400 shall be described in more detail in the context of FIG. 4 below. The clients 132, 134 include respective readers 141, 142 and the clients 136, 138 include respective writers 151, 152. The readers 141, 142 are also referred to as client readers 141, 142 and the writers 151, 152 are also referred to as client writers 151, 152. For the sake of simplicity, each client 132-138 includes only one reader or one writer. However, various embodiments are well suited for clients that include both a reader and a writer.

The server 110 stores an object 120 that has a property 122 in memory (such as dynamic random access memory or on a local or remote data storage device) that the server 110 can access. Any one or more of either the readers 141, 142 or the writers 151, 152 may access the property 122. Any one or more of the readers 141, 142 and the writers 151, 152 can store a copy of the property 122 in memory that is accessible to them. For example, reader 141 may cache a copy of the property 122 in reader 141's cache; reader 142 may cache a copy of the property 122 in reader 142's cache and so on with writers 151, 152.

Use cases 181-184 are defined in terms of the number of readers 141, 142 and the number of writers 151, 152 that are accessing an object. One set of use cases that includes 181 and 182, is associated with stateful mode 171. Another set of use cases that includes, 183 and 184, is associated with stateless mode 172. Use cases 181-184 shall be described in more detail hereinafter.

The system 100 can operate in either a first state mode 191 or a second state mode 192. The first state mode 191 may be either stateful mode 171 or stateless mode 172. Similarly, the second state mode 192 may be either stateful mode 171 or stateless mode 172. According to one embodiment, the system 100 starts in stateful mode 171 when the system 100 is first started.

In some embodiments, use cases 181 and 182 result in fewer messages when the system 100 is operated in stateful mode 171 instead of stateless mode 172. Further, in some embodiments, use cases 183 and 184 result in fewer messages when the system 100 is operated in stateless mode 172 instead of stateful mode 171. Therefore, according to one embodiment, the system 100 transitions 195 between stateful mode 171 and stateless mode 172 depending on which use case 181-184 applies to the system 100. For example, if only one writer 151 or 152 (use case 181) is accessing the object property 122 in stateful mode 171, then a reader 141 or 142 requests to access the object 120 (use case 183) while writer 151 is accessing the object property 122, then the system 100, will transition from stateful mode 171 to stateless mode 172.

Therefore, the system 100 is operating in stateless mode 172 for the use case 183 with a single writer 151 or 152 in conjunction with a single reader 141 or 142 accessing the object 120. Assume now that the single reader 141 or 142 stops accessing the object property 122, which results in use case 182 with a single writer 151 or 152 accessing the object property 122. As will become more evident, stateful mode 171 results in fewer messages for use case 182. Therefore, according to one embodiment, the system 100 will transition from stateless mode 172 to stateful mode 171.

Objects and Properties of Objects

Referring to FIG. 1, examples of objects 120 include but are not limited to files, folders, device objects, symbolic link objects, and so on. The objects 120 have properties 122 such as data and metadata. Examples of metadata include, but are not limited to, the owner of the object, the time the object was created, the time the object was last modified, the size of an object, security information, and so on. Examples of data include the data associated with a file object and the list of files associated with a folder object.

Therefore, examples of object properties 122 include, among other things, data associated with a file object, a list of files associated with a folder object, access mode information, the owner of the object, the time the object was created, the time the object was last modified, the size of an object, and security information, among other things. The phrase "accessing an object" is used herein to refer to accessing any one or more properties 122 associated with an object 120.

Use Cases

Referring to FIG. 1, use cases 181-184 are defined in terms of the number of readers 141, 142 and the number of writers 151, 152 that are accessing an object property 122 at substantially the same time, such as within a threshold period of time or sliding window. For example, table 1 depicted below, illustrates the number of readers and the number of writers associated with each use case 181-184 depicted in FIG. 1.

TABLE 1 illustrating number of readers and number of writers associated with each use case.

| Use Case | Number of writers | Number of readers | Mode |
|---|---|---|---|
| 181 | None (zero) | At least one | Stateful |
| 182 | Single | None (zero) | Stateful |
| 183 | Single | At least one | Stateless |
| 184 | A plurality (at least two) | Zero or more | Stateless |

More specifically, referring to FIG. 1, use case 181 is defined in terms of at least one reader and no writers accessing the object property 122. Therefore, use case 181 applies to one reader 141 or 142, two readers 141 and 142, or a hundred readers, among other things, accessing the object property 122 while neither of the writers 151 or 152 is accessing the object property 122. Use case 182 is defined in terms of one writer and no readers. Therefore, use case 182 applies to either of the writers 151 or 152 accessing the object property 122 while none of the readers 141 or 142 are accessing the object property 122. Use case 183 is defined in terms of a single writer and at least one reader accessing the object property 122. Therefore, use case 183 applies to either of the writers 151 or 152 accessing the object property 122 while either of the readers 141 or 142 or both of the readers 141 and 142 are accessing the object property 122. Use case 184 is defined in terms of a plurality of writers while zero or more readers are accessing the object property 122. Therefore, use case 184 applies to both writers 151 and 152 accessing the object property 122 while neither, one or both of the readers 141, 142 are accessing the object property 122. According to one embodiment, server 110 tracks the number of readers and the number of writers accessing an object property 122. The tracked information can be used to determine which use case 181-184 applies to the system 100.

State Information

As depicted in FIG. 1, the server 110 may maintain state information 112. The server 110, according to one embodiment, uses state information 112 to track clients 132-138 when the system 100 is operating in stateful mode 171. Examples of state information 112 include, but are not limited to, which clients 132-138 are accessing an object property 122, the type of the property 122, the access mode that the client 132-138 has been granted, and so on.

According to another embodiment, the server 110 may or may not include state information 112 when the system 100 is operating in stateless mode 172. For example, the state information 112 can be deleted when the system 100 transitions from stateful mode 171 to stateless mode 172, as described herein. A server 110 may retain state information 112, or a subset thereof, when operating in stateless mode 172 or may retain state information 112, or a subset thereof, for the purpose of handling errors that occur while transitioning between stateful mode 171 and stateless mode 172.

Tokens

According to one embodiment, when operating in the stateful mode 171, a server 110 provides tokens to clients 132-138 that request to access an object property 122. For example, a token is used to grant a client 132-138 a right to access the requested object property 122. Examples of a right to access include, for example, granting a client 132-138 the right to cache the object property 122 in a cache that is accessible by the client 132-138. The token may also include information pertaining to the granularity of the requested object property 122. For example, the granularity could indicate the size of the requested object property 122. The token may also include the type of access, such as read, write, read and write, sharing, no sharing, that has been granted.

A token grants a client 132-138 a right to access an object property 122, according to one embodiment, until the right is revoked. For example, if the server 110 receives a message indicating that a client 136 with a writer 151, 152 has modified the object property 122, the other clients 132, 134, 138 are notified that their copies of the object property 122 are no longer valid. This shall be referred to as "invalidating the object property copy." Continuing the example, the object property copy can be invalidated by the server 110 transmitting the most recent copy of the object property 122 to the other clients 132, 134, 138. In another example, the object property copy can be invalidated by the server 110 transmitting messages to the other clients 132, 134, 138 revoking their tokens. The revoked clients 132, 134, 138 may then request the most recent copy of the object property 122 and request new tokens for the object property 122 from the server 110.

Conventional Systems

Figure 2:
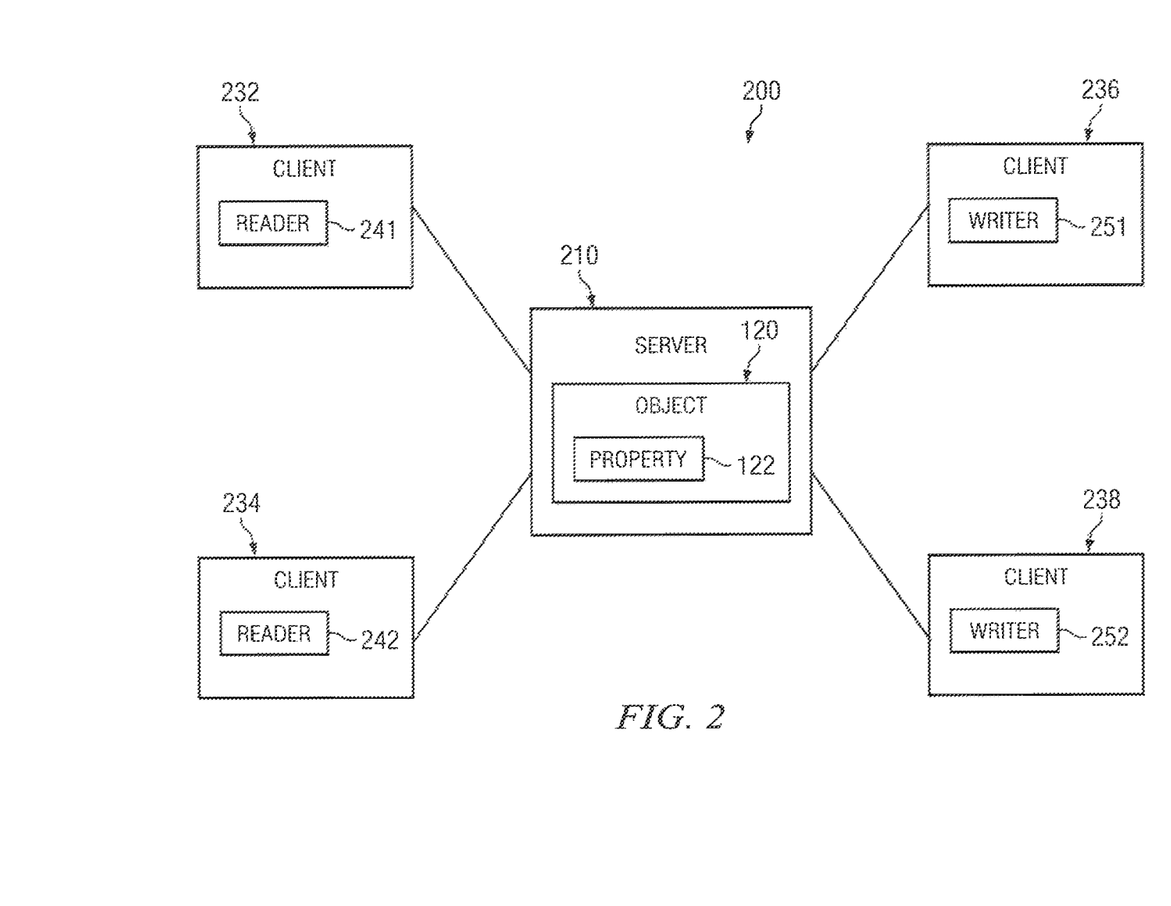
FIG. 2 depicts a block diagram of a conventional client-server system.

FIG. 2 depicts a block diagram of a conventional client-server system 200. A conventional client-server system 200 operates exclusively in stateful mode or stateless mode. The conventional client-server system 200 includes a server 210 and clients 232-238. Clients 232 and 234 include respective readers 241 and 242. Clients 236 and 238 include respective writers 251 and 252. The server 200 is used for storing an object 120 that any one or more of the readers and writers 241, 242, 251, 252 can access.

In many implementations, fewer messages result when a system 100 is operating in stateful mode 171 for use cases 181 and 182 and operating in stateless mode 172 for use cases 183 and 194. The conventional client-server system 200 shall be used to explain why fewer messages result in system 100 when stateful mode 171 is used for use cases 181 and 182 and when stateless mode 172 is used for use cases 183 and 194. Therefore, system 200 shall be used to describe conventional methods of messaging for stateful mode 171 and stateless mode 172.

Although, for the purposes of explanation, the conventional system 200 depicted in FIG. 2 is used to describe both stateful mode 171 and stateless mode 172, a conventional system 200 operates exclusively in either stateful mode or stateless mode. For example, a conventional system 200 does not determine use cases 181-184, a conventional system 200 does not analyze use cases 181-184, a conventional system 200 does not transition between state modes 171 and 172. Further, the correlation between state modes 171, 172 and use cases 181-184 was not performed for conventional methods.

In stateful mode, the server 210 tracks the state of the readers 241, 242 and the writers 251, 252. For example, the server 210 has state information as to which readers 241, 242 and writers 251, 252 have been granted access to an object property 122. The server 210 also has information pertaining to the type of access and which object property 122 has been granted to a reader or writer.

If a reader 241, 242 or a writer 251, 252 requests to access an object property 122, they are granted permission to access the property 122 with a token. The server 210 uses the tokens to provide a high level of coherency for the property 122. For example, if a writer 251 modifies the property 122, the server 210 revokes the tokens that it has granted to the other readers 241, 242 and writers 252 for that property 122. For example, the server 210 sends messages to the other readers 241, 242 and the writer 252 that have been granted tokens and revokes their tokens. Then the respective readers 241, 242 and writer 252 re-request access to the property 122, which results in additional messages being transmitted between the server 210 and the clients 232-238.

In stateless mode, the server 210 does not track the state of the readers 241, 242 and the writers 251, 252. Therefore, the server 210 does not have state information as to which readers 241, 242 or writers 251, 252 are accessing the property 122. The readers 241, 242 and writers 251, 252 decide when to re-request the most recent copy of the property 122, for example, based on how long a respective client 232-238 has cached the object property 122 or based on how the client 232-238 has used the property 122, among other things. For example, a writer 251, 252 may always request the latest copy of a property 122 from the server 210 before modifying the property 122. If the property 122 is important to an application, the application may have a reader 241, 242 or a writer 251, 252 request the latest copy of the property 122 each time the property 122 is used. For example, a bank statement application may always request the latest copy of an important property, such as person's bank statement. If the property 122 is less important, then an application may request the property 122 less often. The owner of an object is an example of a property 122 that may be less important and less likely to change, for example, than a person's bank statement.

Use cases that involve only readers, such as use case 181, or that involve a single writer, such as use case 182, result in unnecessary messaging when performed in stateless mode, according to one embodiment. For example, in stateless mode, the readers 241, 242 for use case 181 continually request the most recent copy of a property 122 despite the fact that the property 122 will not be modified since there are no writers for use case 181. Similarly, in stateless mode, the single writer 251 or 252 would continually be requesting the latest copy of a property 122 despite the fact that there are no other writers to modify the property 122 and there are no readers 241, 242 that would be impacted by the single writer 251 or 252 modifying the property.

Therefore, use cases 181, 182 result in fewer messages when a system 100 operates in stateful mode 171 instead of stateless mode 172. For example, in stateful mode, readers 241, 242 for use case 181 would be granted a token for a requested object property 122 by the server 210. No further messaging would occur until a writer 251 or 252 requests to modify the property 122. Similarly, in stateful mode, the single writer, such as 251, for use case 182 would be granted a token for a requested object property 122 by the server 210. No further messaging would occur until, for example, another writer 252 requests to modify the property 122.

Use cases, such as use cases 183 and 184, which involve readers or writers that may be impacted by a writer modifying a property 122 result in reduced messaging when performed in stateless mode. Use cases 183 and 184 result in message thrashing to revoke tokens when a writer 251, 252 modifies an object property 122. For example, referring to use case 183, assume that the server 210 has provided tokens to 10,000 readers and a single writer 251 granting them access to property 122. When the writer 251 modifies the object property 122, the server 210 will transmit messages to all of the 10,000 readers revoking their tokens. The 10,000 readers will transmit messages back to the server 210 re-requesting access to the object property 122. The server 210 will transmit messages to each of the 10,000 readers granting them new tokens to the object property 122. Similar processing occurs for use case 184, for example, if 100 writers and zero or more readers are accessing a property 122 and only one of the writers modifies the property 122. The server 210 would revoke the tokens for the other 99 writers and the zero or more readers. Messages would be communicated back and forth between the server 210, the 99 writers, and the zero or more readers as a part of revoking the tokens and re-requesting tokens, as described herein.

In contrast, in stateless mode 172 the respective readers, writers, or a combination thereof, for use cases 183 and 184, can decide when to request the most recent copy of a property 122, thus, avoiding the message thrashing between clients 232-238 and the server 210, which results from revoking tokens for the stateful mode 171. Therefore, use cases 183 and 184 result in reduced messaging when performed in stateless mode 172.

Example Server Apparatus for Reducing Messaging in a Client-Server System

Figure 3:
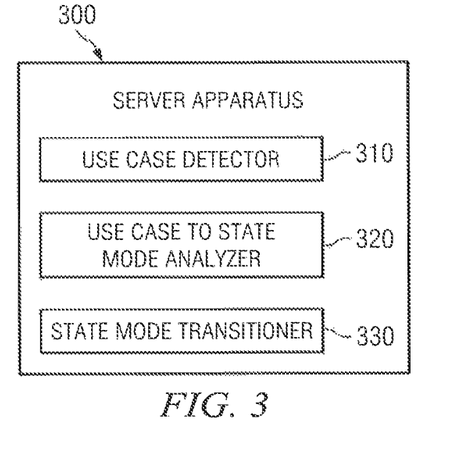
FIG. 3 depicts a block diagram of a server apparatus for reducing messaging in a client-server system, according to one embodiment.

FIG. 3 depicts a functional block diagram of a server apparatus 300 for reducing messaging in a client-server system 100, according to one embodiment. The blocks that represent features in FIG. 3 can be arranged differently than as illustrated, and can implement additional or fewer features than what are described herein. The features represented by the blocks can be implemented by one or more modules, each comprising computer-readable instructions that cause a processor to perform the functions described herein. Further, the features represented by the blocks in FIG. 3 can be combined in various ways. The apparatus 300 can be implemented using hardware, hardware and software, hardware and firmware, or a combination thereof According to one embodiment, the server apparatus 300 includes, among other things, a use-case-detector 310 (also referred to herein as the "server detector"), a use-case-to-state-mode-analyzer 320 (also referred to herein as the "server analyzer"), and a state-mode-transitioner 330 (also referred to herein as the "server transitioner").

The server detector 310 is configured for detecting that the client-server system 110, which is operating in a first state mode 191, has switched from a first use case 181-184 to a second use case 181-184, where the first use case 181-184 and the second use case 181-184 are defined in terms of a number of readers and a number of writers communicating with a server 110. Using the first state mode 191 during the first use case 181-184 reduces messaging in the client-server system 100 as compared to using a second state 192 mode during the first use case 181-184. Either the first state mode 191 or the second state mode 192 can be stateless mode 172 or stateful mode 171.

The server analyzer 320 is configured for determining whether using the second state mode 192 during the second use case 181-184 would reduce messaging in the system 100 as compared to using the first state mode 191 during the second use case 181-184. The server analyzer 320 can use a Table 1, as depicted above, to correlate state modes 171, 172 to use cases 181-184. In particular implementations, the server analyzer 320 may consult a data structure, such as a table. In other implementations, the information in Table 1 can be incorporated into programmatic logic implemented by the server analyzer 320.

The server transitioner 330 is configured for causing the client-server system 100 to transition 195 to the second state mode 192 if operating in the second state mode 192 for the second use case 181-184 would reduce messaging in the client-server system 100 as compared to operating in the first state mode 191 for the second use case 181-184.

According to one embodiment, in order to handle the situation where the first state mode 191 is stateful mode 171 and the second state mode 192 is stateless mode 172, the server state-mode-transitioner 330 is further configured for transmitting, to a client 132-138 that has requested to access the property 122 from the server 110, a transition message that includes an instruction to transition to stateless mode 172; and, in one embodiment, deleting state information 112, stored in the memory that is accessible by the server 110, that pertains to the property 122; and de-registering the client 132-138.

According to one embodiment, in order to handle the situation where the first state mode 191 is stateless mode 172 and the second state mode 192 is stateful mode 171, the server state-mode-transitioner 330 is further configured for receiving a message from a client 132-138 requesting a most recent copy of the property 122; transmitting, to the client 132-138, a transition message that includes the most recent copy of the property 122 from the server 210, a token for accessing the property 122, and an instruction for the client 132-138 to transition from stateless mode 172 to stateful mode 171; and creating state information 112 related to the property 122 as a part of registering the client 132-138 for accessing the property 122.

According to one embodiment, the server apparatus 300 includes computer readable storage medium for storing instructions that implement the detector 310, the analyzer 320 and the transitioner 330 associated with the server apparatus 300. The server apparatus 300, according to one embodiment, also includes a processor for executing the instructions stored on the server apparatus 300's computer readable storage medium.

According to one embodiment, a server apparatus 300 can be configured to operate in one mode. For example, the server apparatus 300 can be configured to operate in just stateful mode 171 or configured to operate in just stateless mode 172. According to one embodiment, a policy can be used to instruct the server apparatus 300 to operate in stateful mode 171 under certain conditions and to operate in stateless mode 172 under other conditions.

Example Client Apparatus for Reducing Messaging in a Client-Server System

Figure 4:
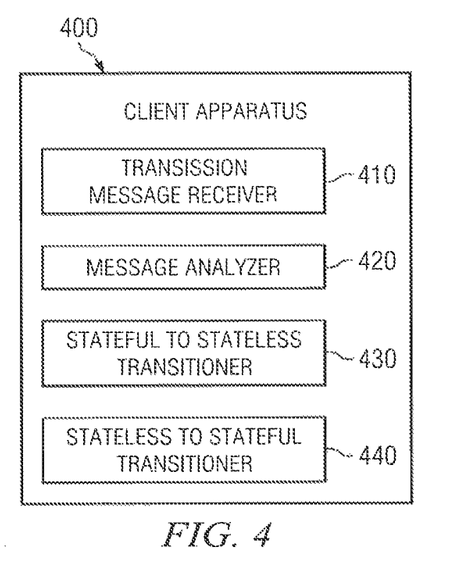
FIG. 4 depicts a block diagram of a client apparatus for reducing messaging in a client-server system, according to one embodiment.

FIG. 4 depicts a functional block diagram of a client apparatus 400 for reducing messaging in a client-server system 100, according to one embodiment. The blocks that represent features in FIG. 4 can be arranged differently than as illustrated, and can implement additional or fewer features than what are described herein. Further, the features represented by the blocks in FIG. 4 can be combined in various ways. The apparatus 400 can be implemented using hardware, hardware and software, hardware and firmware, or a combination thereof.

The client apparatus 400 includes a transition message receiver 410, a message analyzer 420, a stateful-to-stateless-transitioner 430, and a stateless-to-stateful-transitioner 440. The transitioner message receiver 410 is configured for receiving a transition message, for example, from a server apparatus 300. The message analyzer 420 is configured for determining that the transition message includes an instruction to transition from stateful mode 171 to stateless mode 172 or to transition from stateless mode 172 to stateful mode 171. The stateful-to-stateless-transitioner 430 is configured for deleting information, which pertains to the property 122, stored in memory that is accessible by the client 132-138. Examples of the deleted information include, among other things, a token for the property 122 or metadata related to the property 122, among other things. The stateless-to-stateful-transitioner 440 is configured for storing the most recent copy of the property 122 that is obtained from the received transition message, and storing the token that is obtained from the received transition message. According to one embodiment, the token and the copy of the property 122 obtained from the received transition message are stored in memory that is accessible by the client 132-138.

According to one embodiment, the client apparatus 400 includes computer readable storage medium for storing instructions that implement the message receiver 410, the message analyzer 420, and the transitioners 430, 440. The client apparatus 400, according to one embodiment, also includes a processor for executing the instructions stored on the client apparatus 400's computer readable storage medium.

Example Method for Reducing Messaging in a Client-Server System

Figure 5:
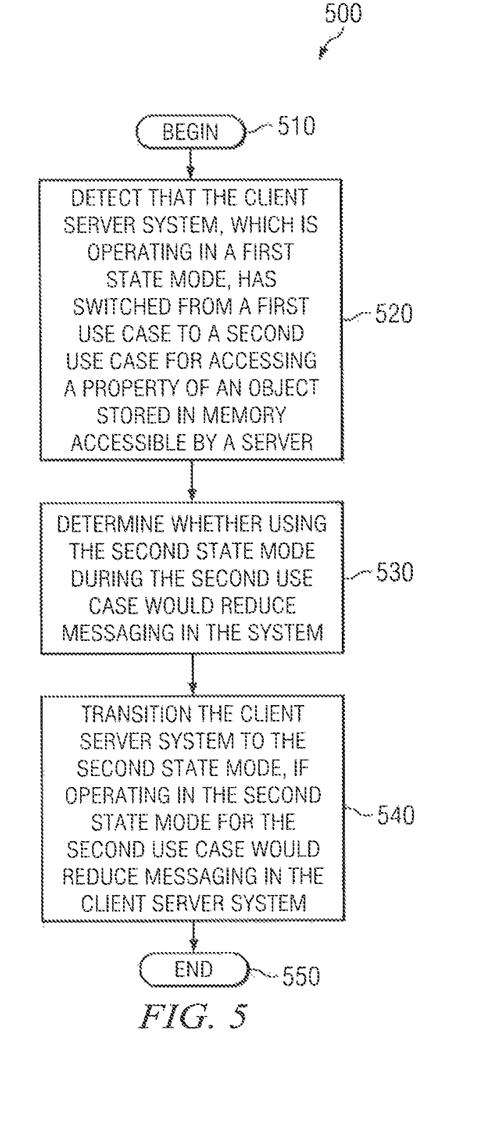
FIG. 5 depicts a flowchart of a method for reducing messaging in a client-server system, according to one embodiment.

FIG. 5 depicts a flowchart 500 for a method of reducing messaging in a client-server system 100, according to one embodiment. Although specific operations are disclosed in flowchart 500, such operations are examples only. That is, embodiments of the present invention are well suited to performing various other operations or variations of the operations recited in flowchart 500. It is appreciated that the operations in flowchart 500 may be performed in an order different than presented, and that not all of the operations in flowchart 500 may be performed.

The following discusses flowchart 500 in the context of switching from stateful mode 171 to stateless mode 172 as to access by one or more of readers and writers of a given object or object property. The client-server systems described herein can operate concurrently in one access mode with respect to one set of objects and a different access mode with respect to another set of objects. In this case, the first state mode 191 is stateful mode 171 and the second state mode 192 is stateless mode. According to one embodiment, the system 100 starts in stateful mode 171 when the system is first started. One or more of the operations set forth below may be implemented by the server apparatus 300.

At 520, a determination is made that the client-server system 100, which is operating in stateful mode 171, has switched from a first use case 181 or 182 to a second use case 183 or 184. For example, the server detector 310 has been operating in stateful mode 171 for either use case 181 or 182. The server's detector 310 recognizes that it is now operating in either use case 183 or 184 due to more readers 141, 142 or more writers 151, 152 requesting to cache or otherwise access the property 122.

At 530, a determination is made as to whether using the stateless mode 172 during the second use case 183 or 184 would reduce messaging in the system 100 as compared to using stateful mode 171 during the second use case 183 or 184. For example, the server's analyzer 320 determines that the second use case 183 or 184 would result in less messaging in system 100 if stateless mode 172 is used. The server analyzer 320 uses Table 1 as a part of the determination of operation 530, according to one embodiment. For example, Table 1 includes a mapping between use cases 181-184 and access modes—i.e., either stateful or stateless. The server's analyzer 320 may access a data structure storing the information depicted in Table 1 to determine whether to transition from a first state mode to a second state mode. In other implementations, the information in Table 1 can be incorporated into programmatic logic implemented by the server analyzer 320.

At 540, the client-server system 100 is transitioned from stateful mode 171 to stateless mode 172. For example, the server's transitioner 330 transmits a transition message to a client 132-138 that is accessing the object property 122. The transitioner message receiver 410, at the client apparatus 400, receives the transition message. The client apparatus' message analyzer 420 determines that the transition message includes an instruction to transition from stateful mode 171 to stateless mode 172. The client apparatus' stateful-to-stateless-transitioner 430 deletes information, which pertains to the property 122, stored in memory that is accessible by the client 132-138. If a client 132-138 requested related metadata, such as when the object property 122 was created or last updated, the stateful-to-stateless-transitioner 430 may also delete the related metadata from the respective client 132, 134's memory. The server transitioner 330 de-registers the client 132-138.

According to one embodiment, once the clients 132-138 that are accessing the property 122 have transitioned from stateful mode 171 to stateless mode 172, the server's transitioner 330 deletes state information 112, which is stored in the memory that is accessible by the server 110 and which pertains to the property 122. According to one embodiment, the server's transitioner 330 waits until a client 132-138 has transitioned from stateful mode 171 to stateless mode 172 before de-registering the client 132-138 so that the server 110 can use the state information 112 to resume communication with the client 132-138 in the event that an error occurs during the state mode transition.

Although in this illustration, various operations—such as transmitting a transition message to a client 132-138, the client 132-138 transitioning between state modes in response to receiving the transition message, deleting state information 112 and de-registering the client 132-138—were described in a certain order, these operations may be performed in a different order. Further, fewer or more operations may be performed as a part of a client-server system 100 transitioning from stateful mode 171 to stateless mode 172.

Assume for the sake of illustration, that the system 100 is operating in use case 183 with a single writer 151 and two readers 141, 142. Since the readers 141, 142 and the writer 151 are in stateless mode 172, according to one embodiment, they will periodically request the most recent copy of the object property 122 from the server 110. For example, the readers 141 and 142 determine whether to request updates based on criteria, such as whether the most recent copy of object property 122 is sufficiently up to date for their purposes. Writers, such as writer 151, typically request the most recent copy of object property 122 from the server 110 before the writer 151 modifies the object property 122. A writer 151 or 152, according to one embodiment, transmits its modified copy of object property 122 to the server 110 immediately after modifying it. The system 100 will continue in stateless mode 172 as long as use case 183 or 184 continues, according to one embodiment. For example, the system 100 will continue in stateless mode 172 as long as there is a single writer in conjunction with at least one reader (use case 183) or a plurality of writers with zero or more readers (use case 184).

The following discusses flowchart 500 in the context of switching from stateless mode 172 to stateful mode 171. In this case, the first state mode 191 is stateless mode 172 and the second state mode 192 is stateful mode.

At 520, a determination is made that the client-server system 100, which is operating in stateless mode 172, has switched from a first use case 183 or 184 to a second use case 181 or 182. For example, the server detector 310 recognizes that it is now operating in either use case 181 or 182 due to fewer readers 141, 142 or fewer writers 151, 152 requesting to access the property 122.

In a specific example, assume that the client-server system 100 has been operating in use case 183 with a single writer 151 and two readers 141 and 142. Assume for the sake of illustration, that the single writer 151 has made its last modification to the object property 122. The client 136 that the writer 151 resides on may be instructed that this is the last modification by a user of the client 136, an application that is modifying the object property 122 via the writer 151, or the writer 151 itself, or a combination thereof, among other things. The client 136, which the writer 151 resides on, indicates to the server 110 that this is the last modification to the object property 122. The client 136 can use the writer 151 to indicate to the server 110 that this is the last modification to object property 122. Since writer 151 has made its last modification to the object property 122, the system 100 is operating in use case 181 with two readers 141 and 142 and no writers, according to one embodiment.

At 530, a determination is made as to whether using the stateful mode 171 during use case 181 or 181 would reduce messaging in the system 100 as compared to using stateless mode 172 during use case 181 or 182. For example, the server's analyzer 320 determines that the second use case 181 or 182 would result in less messaging in system 100 if stateful mode 171 is used.

At 540, the client-server system 100 is transitioned from stateless mode 172 to stateful mode 171. Continuing the example, at this point in time the clients 132-138 are operating in stateless mode 172. When the server 110 receives a message from a client 132-138 requesting a most recent copy of the property 122, the server transitioner 330 transmits a transition message to the client 132-138. The transition message, according to one embodiment, includes the most recent copy of the property 122 from the server 210, a token for accessing the property 122, and an instruction for the client 132-138 to transition from stateless mode 172 to stateful mode 171. According to another embodiment, information such as the most recent copy of the property 122, the token, and so on can be communicated in a message that is separate from the transition message.

The transitioner message receiver 410, at the respective client apparatus 400, receives the transition message. The transition message includes the most recent copy of the property 122 and a token for accessing the property 122. The client apparatus' message analyzer 420 determines that the transition message includes an instruction to transition from stateless mode 172 to stateful mode 171. The client apparatus' stateless-to-stateful-transitioner 440 caches the most recent copy of the property 122 that it obtained from the received transition message, and stores the token that it obtained from the received transition message.

The server's transitioner 330 creates state information 112 related to the property 122 as a part of registering the client 132-138 for accessing the property 122.

As stated herein, for the sake of simplicity, flowchart 500 has been described in the context of FIG. 1 that depicts clients 132-136 with either a reader 141, 142 or a writer 151, 152. However, embodiments are well suited for clients that have one or more readers and one or more writers. For example, any one or more of clients 132-136 could have both a reader and a writer.

The above illustration is only provided by way of example and not by way of limitation. There are other ways of performing the method described by flowchart 500.

Computer Readable Storage Medium

Any one or more of the embodiments described herein can be implemented using computer readable storage medium and computer-executable instructions which reside, for example, in computer-readable storage medium of a computer system or like device. The computer readable storage medium can be any kind of memory that instructions can be stored on. Examples of the computer readable storage medium include but are not limited to a disk, a compact disk (CD), a digital versatile device (DVD), read only memory (ROM), flash, and so on. As described above, certain processes and operations of various embodiments of the present invention are realized, in one embodiment, as a series of instructions (e.g., software program) that reside within computer readable storage memory of a computer system and are executed by the processor of the computer system. When executed, the instructions cause the computer system to implement the functionality of various embodiments of the present invention.

Example Computing System Architectures

While the foregoing processes and mechanisms can be implemented by a wide variety of physical systems and in a wide variety of network environments, the systems described below provide example computing system architectures for didactic, rather than limiting, purposes.

Figure 6:
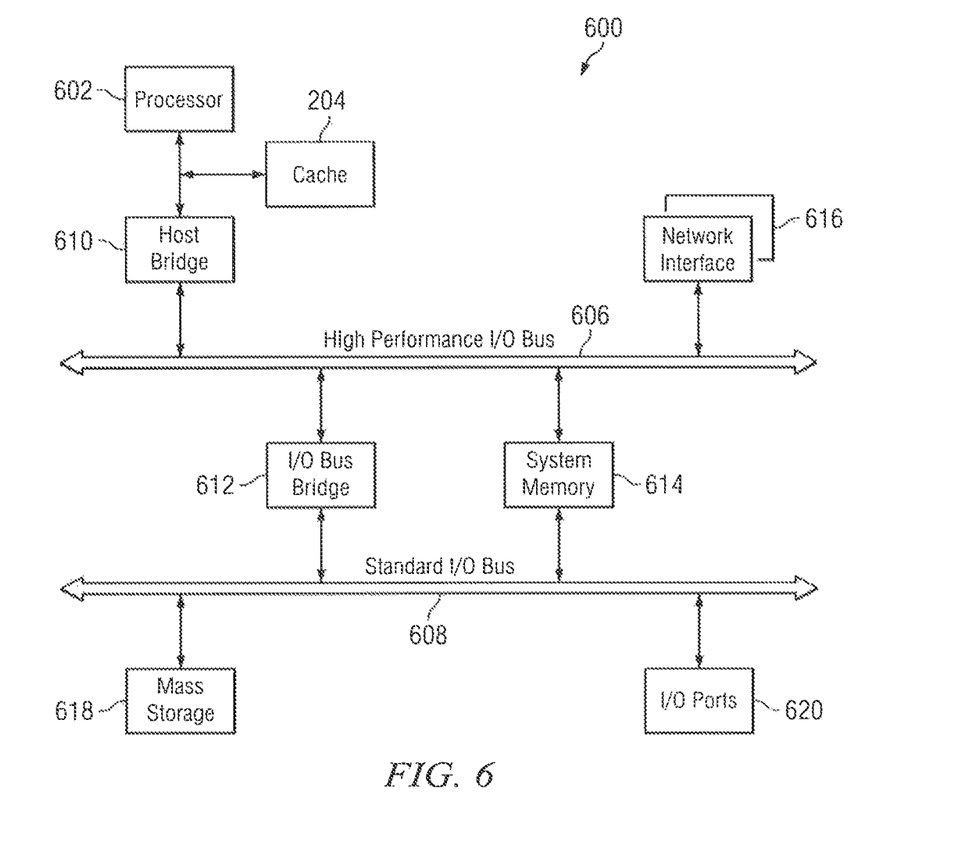
FIG. 6 depicts an example computer system architecture according to one implementation of the invention.

FIG. 6 illustrates an example computing system architecture, which may be used to implement a physical server or client. In one embodiment, hardware system 600 comprises a processor 602, a cache memory 604, and one or more executable modules and drivers, stored on a computer readable medium, directed to the functions described herein. Additionally, hardware system 600 includes a high performance input/output (I/O) bus 606 and a standard I/O bus 608. A host bridge 610 couples processor 602 to high performance I/O bus 606, whereas I/O bus bridge 612 couples the two buses 606 and 608 to each other. A system memory 614 and one or more network/communication interfaces 616 couple to bus 606. Hardware system 600 may further include video memory (not shown) and a display device coupled to the video memory. Mass storage 618, and I/O ports 620 couple to bus 608. Hardware system 600 may optionally include a keyboard and pointing device, and a display device (not shown) coupled to bus 608. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 600 are described in greater detail below. In particular, network interface 616 provides communication between hardware system 600 and any of a wide range of networks, such as an Ethernet (e.g., IEEE 802.3) network, etc. Mass storage 618 provides permanent storage for the data and programming instructions to perform the above-described functions implemented in the cache or proxy 30, whereas system memory 614 (e.g., DRAM) provides temporary storage for the data and programming instructions when executed by processor 602. I/O ports 620 are one or more serial and/or parallel communication ports that provide communication between additional peripheral devices, which may be coupled to hardware system 600. In some implementations, hardware system 600 may include a data storage interface that accesses files remotely via a Network Attached Storage (NAS) device or a Storage Area Network (SAN).

Hardware system 600 may include a variety of system architectures; and various components of hardware system 600 may be rearranged. For example, cache 604 may be on-chip with processor 602. Alternatively, cache 604 and processor 602 may be packed together as a "processor module," with processor 602 being referred to as the "processor core." Furthermore, certain embodiments of the present invention may not require nor include all of the above components. For example, the peripheral devices shown coupled to standard I/O bus 608 may couple to high performance I/O bus 606. In addition, in some embodiments, only a single bus may exist, with the components of hardware system 600 being coupled to the single bus. Furthermore, hardware system 600 may include additional components, such as additional processors, storage devices, or memories.

As discussed below, in one implementation, the operations of one or more of the client or server modules described herein are implemented as a series of executable modules run by hardware system 600. In a particular embodiment, a set of software modules or drivers implements a network and/or storage device communications protocol stack, including a link layer driver, a network layer driver, one or more transport layer modules (e.g., TCP, UDP, etc.), session layer modules, application layer modules, storage device drivers and the like. The foregoing functional modules may be realized by hardware, executable modules stored on a computer readable medium, or a combination of both. For example, the functional modules may comprise a plurality or series of instructions to be executed by a processor in a hardware system, such as processor 602. Initially, the series of instructions may be stored on a storage device, such as mass storage 618. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 616. The instructions are copied from the storage device, such as mass storage 618, into memory 614 and then accessed and executed by processor 602.

An operating system manages and controls the operation of hardware system 600, including the input and output of data to and from software applications (not shown). The operating system provides an interface between the software applications being executed on the system and the hardware components of the system. Any suitable operating system may be used, such as the Windows Operating System offered by Microsoft Corporation, the Apple Macintosh Operating System, available from Apple Computer Inc. of Cupertino, Calif., UNIX operating systems, LINUX operating systems, BSD operating systems, and the like. Of course, other implementations are possible.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

Conclusion

According to one embodiment, a client-server system 100 (FIG. 1), which transitions between two state modes 191 and 192, such as the stateful mode 171 and the stateless mode 172, reduces the amount of messaging between client devices 132-138 and the server device 110, in comparison to a conventional client-server system 200 (FIG. 2) that only operates in one state mode. For example, the client-server system 100 reduces the amount of messaging by determining the number of readers 141, 142 and the number of writers 151, 152 that are communicating with the server device 110 to access a property 122. According to one embodiment, the messaging in the client-server system 100 is reduced by transitioning operation of the client-server system 100 between stateful mode 171 and stateless mode 172 based on the number of readers 141, 142 and the number of writers 151, 152 communicating with the server device 110 to access the property 122. According to one embodiment, the number of readers 141, 142 and the number of writers 151, 152 are used to determine a use case 181-184. A determination is made as to whether stateful mode 171 or stateless mode 172 would provide a reduction of messaging for the determined use case 181-184. Stateful mode 171 provides reduced messaging for use cases 181 and 182. Stateless mode 172 provides reduced messaging for use cases 183 and 184. The system 100 transitions to a state mode 171 or 172 if the state mode 171 or 172 reduces messaging for the determined use case 181-184. The client-server system 100 shall also be referred to as a "state mode transitioning system" and the conventional client-server system shall also be referred to as a "non-transitioning system."

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations. However, any two or more embodiments may be combined. Further, any embodiment may be used separately from any other embodiments. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

What is claimed is:

1. A method for providing a client system with access to a property of an object associated with a server comprising:
    detecting, by at least one processor, that a client-server system that is operating in a first state mode has switched from a first use case to a second use case, wherein operating the client-server system in the first state mode for the first use case reduces messaging in the client-server system as compared to operating the client-server system in a second state mode for the first use case;
    determining, by the at least one processor, that operating the client-server system in the second state mode for the second use case would reduce messing in the system as compared to operating the client-server system in the first state mode for the second use case; and
    determining that the first state mode is stateful and the second state mode is stateless, the second use case selected from a group consisting of a single-writer-with-at-least-one reader-use case, and a plurality of writers-with-zero-or-more-readers-use-case; and
    transitioning the client-server system from the first state mode that is stateful to the second state mode that is stateless in response to the use-case-to-state-mode-analyzer determining that the second use case is selected from the group consisting of the single-writer-with-at-least-one reader-use case, and the plurality of writers-with-zero-or-more-readers-use-case.

2. The method of claim 1, wherein the first use case and the second use case are each defined in terms of a number of readers and a number of writers communicating with the server to access the object.

3. A method for providing a client system with access to a property of an object associated with a server comprising:
    detecting, by at least one processor, that a client-server system that is operating in a first state mode has switched from a first use case to a second use case, wherein operating the client-server system in the first state mode for the first use case reduces messaging in the client-server system as compared to operating the client-server system in a second state mode for the first use case;
    determining, by the at least one processor, that operating the client-server system in the second state mode for the second use case would reduce messing in the system as compared to operating the client-server system in the first state mode for the second use case; and
    determining that the first state mode is stateless and the second state mode is stateful, the second use case is selected from a group consisting of an at-least-one-reader-with-no-writers-use case, and a single-writer-with-no-readers-use-case; and
    transitioning the client-server system from the first state mode that is stateless to the second state mode that is stateful in response to the use-case-to-state-mode-analyzer determining that the second use case is selected from the group consisting of the at-least-one-reader-with-no-writers-use case, and the single-writer-with-no-readers-use-case.

4. The method of claim 1, wherein:
    transitioning the client-server system to the second state mode comprises:
        transitioning the server to the stateless mode; and
        transmitting to a client, which requested to access the property from the server, a transition message that includes an instruction to transition to the second state mode that is stateless.

5. The method of claim 4, further comprising:
    deleting, by the at least one processor, state information that is stored in a memory accessible by the server, the state information pertaining to the property; and
    de-registering the client.

6. The method of claim 3, wherein
    transitioning the client-server system to the stateful mode comprises:
        receiving a message from a client requesting a most recent copy of the property;
        transmitting, to the client, a transition message that includes the most recent copy of the property, a token for accessing the property, and an instruction for the client to transition from the first mode that is stateless to the second mode that is stateful; and
        storing, in a memory, state information related to the property as a part of registering the client for accessing the property.

7. An apparatus for providing a client system with access to a property of an object associated with a server, the apparatus comprising:
    a memory storing data defining a first use case and a second use case;
    a processor having access to the memory; and
    one or more code modules each comprising computer-readable code operative, when executed, to cause the processor to implement:
        a use-case-detector configured to detect that a client-server system that is operating in a first state mode has transitioned from the first use case to the second use case, wherein operating in the first state mode for the first use case reduces messaging in the client-server system as compared to operating the client-server system in a second state mode for the first use case;
        a use-case-to-state-mode-analyzer configured to determine that operating the client-server system in the second state mode for the second use case would reduce messaging in the system as compared to operating the client-server system in the first state mode for the second use case, the use-case-to-state-mode analyzer is further configured to determine that the first state mode is stateful and the second state mode is stateless, the second use case being selected from a group consisting of a single-writer-with-at-least-one reader-use case, and a plurality of writers-with-zero-or-more-readers-use-case; and a state-mode-transitioner configured to transition the client-server system from the first state mode that is stateful to the second state mode that is stateless in response to the use-case-to-state-mode-analyzer determining that the second use case is selected from the group consisting of the single-writer-with-at-least-one reader-use case, and the plurality of writers-with-zero-or-more-readers-use-case.

8. The apparatus of claim 7, wherein the first use case and the second use case are each defined in terms of a number of readers and a number of writers communicating with the server to access the object.

9. An apparatus for providing a client system with access to a property of an object associated with a server, the apparatus comprising:

a memory storing data defining a first use case and a second use case;

a processor having access to the memory; and one or more code modules each comprising computer-readable code operative, when executed, to cause the processor to implement:

a use-case-detector configured to detect that a client-server system that is operating in a first state mode has transitioned from the first use case to the second use case, wherein operating in the first state mode for the first use case reduces messaging in the client-server system as compared to operating the client-server system in a second state mode for the first use case;

a use-case-to-state-mode-analyzer configured to determine that operating the client-server system in the second state mode for the second use case would reduce messaging in the system as compared to operating the client-server system in the first state mode for the second use case, the use-case-to-state-mode analyzer is further configured to determine that the first state mode is stateless and the second state mode is stateful, the second use case being selected from a group consisting of an at-least-one-reader-with-no-writers-use case, and a single-writer-with-no-readers-use-case; and a state-mode-transitioner configured to transition the client-server system from the first state mode that is stateless to the second state mode that is stateful in response to the use-case-to-state-mode-analyzer determining that the second use case is selected from the group consisting of the at-least-one-reader-with-no-writers-use case, and the single-writer-with-no-readers-use-case.

10. The apparatus of claim 7 wherein:

when transitioning the client-server system to the second state mode, the state-mode-transitioner is configured to:

transitioning the server to the stateless mode; and transmitting to a client, which requested to access the property from the server, a transition message that includes an instruction to transition to the second state mode that is stateless.

11. The apparatus of claim 10, wherein the state-mode-transitioner is further configured to:

delete state information that is stored in a memory accessible by the server, the state information pertaining to the property; and de-register the client.

12. The apparatus of claim 9 wherein:

wherein, when transitioning the client-server system to the second state mode, the state-mode-transitioner is configured to:

receive a message from a client requesting a most recent copy of the property;

transmit, to the client, a transition message that includes the most recent copy of the property, a token for accessing the property, and an instruction for the client to transition from the first mode that is stateless to the second mode that is stateful; and store, in a memory, state information related to the property as a part of registering the client for accessing the property.

13. A non-transitory computer readable storage medium storing computer-executable instructions that are operable when executed by a computer system to:

detect that a client-server system that is operating in a first state mode has switched from a first use case to a second use case, wherein operating the client-server system in the first state mode for the first use case reduces messaging in the client -server system as compared to operating the client-server system in a second state mode for the first use case;

determine that operating the client-server system in the second state mode for the second use case would reduce messing in the system as compared to operating the client-server system in the first state mode for the second use case; and determine that the first state mode is stateful and the second state mode is stateless, the second use case being selected from a group consisting of a single-writer-with-at-least-one reader-use case, and a plurality of writers-with-zero-or-more-readers-use-case; and transition the client-server system from the first state mode that is stateful to the second mode that is stateless in response to the use-case-to-state-mode-analyzer determining that the second use case is selected from the group consisting of the single-writer-with-at-least-one reader-use case, and the plurality of writers-with-zero-or-more-readers-use-case.

14. The non-transitory computer readable storage medium of claim 13, wherein the first use case and the second use case are each defined in terms of a number of readers and a number of writers communicating with the server to access the object.

15. A non-transitory computer readable storage medium storing computer-executable instructions that are operable when executed by a computer system to:

detect that a client-server system that is operating in a first state mode has switched from a first use case to a second use case, wherein operating the client-server system in the first state mode for the first use case reduces messaging in the client-server system as compared to operating the client-server system in a second state mode for the first use case;

determine that operating the client-server system in the second state mode for the second use case would reduce messing in the system as compared to operating the client-server system in the first state mode for the second use case; and determine that the first state mode is stateless and the second state mode is stateful, the second use case being selected from a group consisting of an at-least-one-reader-with-no-writers-use case, and a single-writer-with-no-readers-use-case; and transition the client-server system from the first state mode that is stateless to the second state mode that is stateful in response to the use-case-to-state-mode-analyzer determining that the second use case is selected from the group consisting of the at-least-one-reader-with-no-writers-use case, and the single-writer-with-no-readers-use-case.

16. The non-transitory computer readable storage medium of claim 13, wherein:
the computer-executable instructions are further operable when executed to:
transition the server to the stateless mode; and
transmit to a client, which requested to access the property from the server, a transition message that includes an instruction to transition to the second state mode that is stateless.

17. The non-transitory computer readable storage medium of claim 16, wherein the computer-executable instructions are further operable when executed to:
delete, by the at least one processor, state information that is stored in a memory accessible by the server, the state information pertaining to the property; and
de-register the client.

18. The non-transitory computer readable storage medium of claim 15, wherein:
the computer-executable instructions are further operable when executed to:
receive a message from a client requesting a most recent copy of the property;
transmit, to the client, a transition message that includes the most recent copy of the property, a token for accessing the property, and an instruction for the client to transition from the first state mode that is stateless to the second state mode that is stateful; and
store, in a memory, state information related to the property as a part of registering the client for accessing the property.

* * * * *

UNITED STATES PATENT AND TRADEMARK OFFICE
CERTIFICATE OF CORRECTION

| | | |
|---|---|---|
| PATENT NO. | : 8,554,909 B2 | Page 1 of 1 |
| APPLICATION NO. | : 13/471555 | |
| DATED | : October 8, 2013 | |
| INVENTOR(S) | : Reinart et al. | |

It is certified that error appears in the above-identified patent and that said Letters Patent is hereby corrected as shown below:

Claims:

In column 15, line 40, delete "messing" and insert --messaging--

In column 16, line 3, delete "messing" and insert --messaging--

In column 18, line 2, delete "wherein, when" and insert --when--

In column 18, line 27, delete "messing" and insert --messaging--

In column 18, line 58, delete "messing" and insert --messaging--

Signed and Sealed this
Twenty-second Day of April, 2014

Michelle K. Lee
*Deputy Director of the United States Patent and Trademark Office*